(12) United States Patent
Iwanaka et al.

(10) Patent No.: US 7,469,758 B2
(45) Date of Patent: Dec. 30, 2008

(54) ELECTRIC VEHICLE DRIVE CONTROL DEVICE AND CONTROL METHOD THEREFOR

(75) Inventors: Makoto Iwanaka, Anjo (JP); Shigeki Takami, Anjo (JP); Ryuji Ibaraki, Nishikamo-gun (JP); Tooru Matsubara, Toyota (JP); Hiroyuki Shibata, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 11/586,634

(22) Filed: Oct. 26, 2006

(65) Prior Publication Data
US 2007/0114081 A1   May 24, 2007

(30) Foreign Application Priority Data
Oct. 26, 2005   (JP) ............................. 2005-311609

(51) Int. Cl.
*B60K 1/00* (2006.01)

(52) U.S. Cl. ...................... 180/65.1; 180/65.6; 701/20; 903/910

(58) Field of Classification Search ............... 180/65.2, 180/65.3, 65.4, 65.6, 65.8, 65.7; 903/910, 903/914, 923, 918; 701/20, 110
See application file for complete search history.

(56) References Cited

U.S. PATENT DOCUMENTS

| | | | | |
|---|---|---|---|---|
| 3,623,568 A | * | 11/1971 | Mori | 180/65.2 |
| 5,775,449 A | * | 7/1998 | Moroto et al. | 180/65.2 |
| 6,048,289 A | * | 4/2000 | Hattori et al. | 180/65.2 |
| 6,077,186 A | | 6/2000 | Kojima et al. | |
| 6,098,733 A | * | 8/2000 | Ibaraki et al. | 180/65.2 |
| 6,416,437 B2 | * | 7/2002 | Jung | 180/65.2 |
| 6,455,947 B1 | * | 9/2002 | Lilley et al. | 180/65.6 |
| 6,516,253 B2 | * | 2/2003 | Boggs et al. | 701/20 |
| 6,554,736 B2 | * | 4/2003 | Takano et al. | 903/910 |
| 6,570,265 B1 | * | 5/2003 | Shiraishi et al. | 180/65.2 |
| 6,726,592 B2 | * | 4/2004 | Kotani | 903/910 |
| 6,886,648 B1 | * | 5/2005 | Hata et al. | 180/65.2 |
| 2003/0078134 A1 | | 4/2003 | Kojima et al. | |
| 2005/0209760 A1 | | 9/2005 | Tabata et al. | |

FOREIGN PATENT DOCUMENTS

JP   A-51-49364   4/1976

(Continued)

*Primary Examiner*—Hau V Phan
(74) *Attorney, Agent, or Firm*—Oliff & Berridge, PLC

(57) ABSTRACT

An electric vehicle drive control device includes a first electric motor and a second electric motor; a differential device that includes first, second and third rotational elements, wherein the first rotational element is connected with the first electric motor, the second rotational element is connected with the second electric motor, and the third rotational elements is connected with the engine; a transmission that is connected with the second electric motor via a transmission shaft, and that shifts a speed of a rotation transferred from the transmission shaft; and a controller that: judges whether an engine start request for starting the engine is generated and whether a downshift request is generated; and starts, if the engine start request and the downshift request are generated, one of an engine start control and a downshift control when the other of the engine start control and the downshift control is executed.

13 Claims, 11 Drawing Sheets

FOREIGN PATENT DOCUMENTS

| | | |
|---|---|---|
| JP | A-09-308009 | 11/1997 |
| JP | A-11-082260 | 3/1999 |
| JP | A-11-178113 | 7/1999 |
| JP | A-2000-002327 | 1/2000 |
| JP | A-2003-127681 | 5/2003 |
| JP | A-2005-256883 | 9/2005 |
| JP | A-2005-264762 | 9/2005 |

* cited by examiner

|  | C0 | C1 | C2 | B1 | B2 | F1 |
|---|---|---|---|---|---|---|
| 1ST |  | ○ |  |  | (○) | ○ |
| 2ND |  | ○ |  | ○ |  |  |
| 3RD | ○ | ○ |  |  |  |  |
| 4TH | ○ |  |  | ○ |  |  |
| REV |  |  | ○ |  | ○ |  |

ELECTRIC VEHICLE DRIVE CONTROL DEVICE AND CONTROL METHOD THEREFOR

TECHNICAL FIELD

The present invention relates to an electric vehicle drive control device and a control method therefor.

BACKGROUND ART

Conventionally, a vehicle driving apparatus that is installed in an electric vehicle such as a hybrid vehicle and wherein the torque of an engine, or more specifically, wherein a part of the engine torque is transferred to a generator and the rest of the engine torque is transferred to driven wheels, includes a planetary gear unit with a sun gear, a ring gear, and a carrier. The carrier is connected to the engine, while the ring gear and a motor are connected to the driven wheels via a transmission. Also, the sun gear is connected to the generator. Accordingly, the rotation output from the ring gear and the motor is transferred to the driven wheels so that a driving force is generated.

During running of the hybrid vehicle where the motor is driven and a torque of the motor, i.e., a motor torque, is transferred to the driven wheels via the transmission, an engine start control and a downshift control are executed when it is necessary to change a speed for downshifting in the transmission or to start the engine. In such case, either the engine start control or the downshift control is started ahead of the other. Once this control is ended, the other control is subsequently started.

Further, in cases where either the engine start control or the downshift control is being executed and it becomes necessary to execute the other control, once the currently executed control is ended, the other control is subsequently started.

DISCLOSURE OF THE INVENTION

Problem to be Solved by the Invention

However, in the conventional vehicle driving apparatus, regardless of whether the engine start control or the downshift control is started first, the speed change for downshifting causes a sharp increase followed by a sharp decrease, or a sharp decrease followed by a sharp increase, in a rotation speed of the generator, i.e., a generator rotation speed. Thus, the generator rotation speed experiences successive large changes.

Consequently, an inertia torque generated from the change in the generator rotation torque is transferred to the driven wheels. As a result, a shift shock occurs and the running feel is diminished.

In addition, once a control is ended, the other control is started. Therefore, a long amount of time passes before the entire control is ended, leading to a delay in the response of the hybrid vehicle with respect to an acceleration operation by a driver. As a result, the hybrid vehicle feels sluggish and the running feel is diminished.

It is an object of the present invention to provide an electric vehicle drive control device and a control method therefor that solve the problems with the conventional vehicle driving apparatus and that are capable of preventing a diminished running feel when an engine start control and a downshift control are executed.

Means for Solving the Problem

To achieve this, an electric vehicle drive control device according to the present invention comprises first and second electric motors that are mechanically connected with an engine; a differential device that includes first to third rotational elements, wherein the first rotational element is connected with the first electric motor, the second rotational element is connected with the second electric motor, and the third rotational elements is connected with the engine; a transmission that is connected with the second electric motor via a transmission shaft, and shifts a speed of rotation transferred to the transmission shaft; simultaneous control condition judgment processing means that judges whether an engine start request for starting the engine is generated, and whether a downshift request is generated; and simultaneous control execution processing means that, if the engine start request and the downshift request are generated, executes a control among an engine start control and a downshift control, during which the other control is started.

Effects of the Invention

According to the present invention, an electric vehicle drive control device comprises first and second electric motors that are mechanically connected with an engine; a differential device that includes first to third rotational elements, wherein the first rotational element is connected with the first electric motor, the second rotational element is connected with the second electric motor, and the third rotational elements is connected with the engine; a transmission that is connected with the second electric motor via a transmission shaft, and shifts a speed of rotation transferred to the transmission shaft; simultaneous control condition judgment processing means that judges whether an engine start request for starting the engine is generated, and whether a downshift request is generated; and simultaneous control execution processing means that, if the engine start request and the downshift request are generated, executes a control among an engine start control and a downshift control, during which the other control is started.

In this case, if the engine start request and the downshift request are generated, while one control among the engine start control and the downshift control is being executed, the other control is started. Thus, there are no successive large changes in the rotation speed of the first electric motor.

Accordingly, the shift shock is smoothed and can prevent a diminished running feel.

In addition, one of the controls is started while the other control is being executed, and therefore the time until the overall control is complete can be shortened. Accordingly, the electric vehicle can respond faster to an accelerator operation by the driver. This can ensure that the hybrid vehicle does not feel sluggish and prevent a diminished running feel.

BRIEF DESCRIPTION OF THE DRAWINGS

FIG. 1 is a conceptual drawing of an engine and a vehicle driving apparatus according to an embodiment of the present invention.
FIG. 2 is a drawing of an operation table for a transmission according to the embodiment of the present invention.
FIG. 3 is a velocity diagram for the transmission according to the embodiment of the present invention.
FIG. 4 is a block diagram of an electric vehicle drive control device according to the embodiment of the present invention.

FIG. 5 is a first drawing that shows an example of a change in the velocity diagram of a planetary gear unit when an engine start control and a downshift control are executed according to the embodiment of the present invention.

FIG. 6 is a second drawing that shows an example of a change in the velocity diagram of the planetary gear unit when the engine start control and the downshift control are executed according to the embodiment of the present invention.

FIG. 7 is a first flowchart that shows an operation of simultaneous control judgment processing means according to the embodiment of the present invention.

FIG. 8 is a second flowchart that shows an operation of the simultaneous control judgment processing means according to the embodiment of the present invention.

FIG. 9 is a flowchart that shows an operation of simultaneous control execution processing means according to the embodiment of the present invention.

FIG. 10 is a first time chart that shows an operation of the simultaneous control execution processing means according to the embodiment of the present invention.

FIG. 11 is a second time chart that shows an operation of the simultaneous control execution processing means according to the embodiment of the present invention.

FIG. 12 is a third time chart that shows an operation of the simultaneous control execution processing means according to the embodiment of the present invention.

FIG. 13 is a fourth time chart that shows an operation of the simultaneous control execution processing means according to the embodiment of the present invention.

DESCRIPTION OF THE REFERENCE NUMERALS

11 ENGINE
13 PLANETARY GEAR UNIT
15 TRANSMISSION SHAFT
16 GENERATOR
18 TRANSMISSION
25 MOTOR
55 VEHICLE CONTROL DEVICE
CR1 CARRIER
R1 RING GEAR
S1 SUN GEAR

BEST MODE FOR CARRYING OUT THE INVENTION

Hereinafter, an embodiment of the present invention will be explained in detail, with reference to the drawings. In the explanation, an electric vehicle drive control device and a control method therefor to drive a hybrid vehicle will be described.

Figure 1:
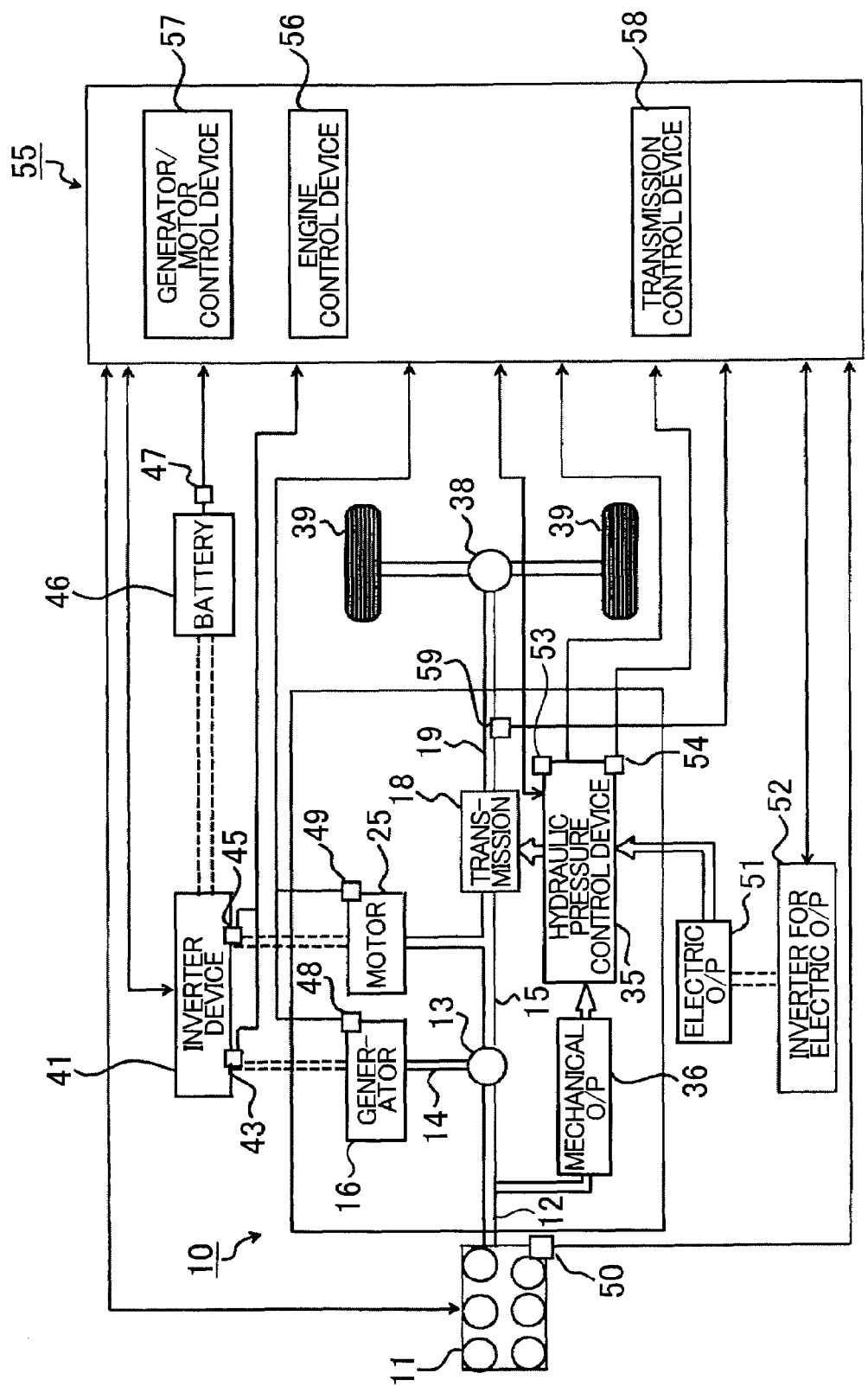
[FIG. 1]

FIG. 1 is a conceptual drawing of an engine and a vehicle driving apparatus according to the embodiment of the present invention.

In the drawing, reference numeral 10 denotes a vehicle driving apparatus, whereas reference numeral 11 denotes an engine (E/G), and reference numeral 12 denotes an output shaft from which a rotation and an engine torque TE that are generated by driving the engine 11 are output. The output shaft 12 also serves as an input shaft for the vehicle driving apparatus 10. In addition, reference numeral 13 denotes a planetary gear unit that serves as a differential device for distributing the engine torque TE input via the output shaft 12. Reference numerals 14 and 15 denote transmission shafts that receive a rotation generated by the planetary gear unit 13 and also receive the engine torque TE distributed by the planetary gear unit 13. Reference numeral 16 denotes a generator (G) that serves as a first electric motor as well as a first electric machine, and is connected to the planetary gear unit 13 via the transmission shaft 14. Reference numeral 25 denotes a motor (M) that serves as a second electric motor as well as a second electric machine, and is connected to the planetary gear unit 13 via the transmission shaft 15.

Reference numeral 18 denotes a transmission that is connected to the planetary gear unit 13 and to the motor 25 via the transmission shaft 15. The transmission 18 shifts the speed of the rotation input via the transmission shaft 15, and outputs the rotation whose speed has been shifted to an output shaft 19.

A differential mechanism (not shown) is connected to the output shaft 19. The differential mechanism distributes the rotation transferred via the output shaft 19 and transfers such rotation to driven wheels (not shown). As described here, the engine 11, the generator 16, the motor 25, and the driven wheels are mechanically connected to one another.

The planetary gear unit 13 comprises a single planetary gear and includes a first sun gear S1, a first pinion P1 that meshes with the first sun gear S, a first ring gear R1 that meshes with the first pinion P1, and a first carrier CR1 that rotatably supports the first pinion P1. The first sun gear S1 is connected to the generator 16 via the transmission shaft 14. The first ring gear R1 is connected to the motor 25 and to the transmission 18 via the transmission shaft 15. The first carrier CR1 is connected to the engine 11 via the output shaft 12. The first sun gear S1, the first ring gear R1, and the first carrier CR1 structure a first differential element. The first sun gear S1 structures a first rotational element. The first ring gear R1 and the first carrier CR1 structure a second rotational element and a third rotational element, respectively.

The generator 16 is fixed to the transmission shaft 14. The generator 16 includes a rotor 21 that is rotatably disposed, a stator 22 that is positioned around the rotor 21, and a coil 23 that is wound around the stator 22. The generator 16 generates alternating electric currents that are in U-phase, V-phase, and W-phase, using the rotation transferred via the transmission shaft 14. Also, the generator 16 generates a torque, i.e., a generator torque TG, as necessary with the U-phase, V-phase, and W-phase electric currents, and outputs the generator torque TG generated to the transmission shaft 14.

A generator brake (not shown) is provided between the rotor 21 and a case Cs of the vehicle driving apparatus 10. By engaging the generator brake, it is possible to make the rotor 21 stationary and to stop the rotation of the generator 16 mechanically.

The motor 25 is fixed to the transmission shaft 15. The motor 25 includes a rotor 26 that is rotatably disposed, a stator 27 that is positioned around the rotor 26, and a coil 28 that is wound around the stator 27. The motor 25 generates a motor torque TM, using U-phase, V-phase, and W-phase electric currents that are supplied from a battery, and outputs the motor torque TM generated to the transmission shaft 15.

The transmission 18 includes a first gear unit 31 and a second gear unit 32, each of which is a single planetary gear.

The transmission 18 also includes clutches C0 to C2, brakes B1 and B2, and a one-way clutch F1 that serve as friction engagement elements.

The first gear unit 31 includes a second sun gear S2, a second pinion P2 that meshes with the second sun gear S2, a second ring gear R2 that meshes with the second pinion P2, and a second carrier CR2 that rotatably supports the second pinion P2. The second gear unit 32 includes a third sun gear S3, a third pinion P3 that meshes with the third sun gear S3, a third ring gear R3 that meshes with the third pinion P3, and a third carrier CR3 that rotatably supports the third pinion P3.

The second sun gear S2, the second ring gear R2, and the second carrier CR2 structure a second differential element. The third sun gear S3, the third ring gear R3, and the third carrier CR3 structure a third differential element.

The second sun gear S2 is connected to the transmission shaft 15 via the clutch C2 and is also connected to the case Cs via the brake B1. The second ring gear R2 is connected to the third carrier CR3 and the output shaft 19. The second carrier CR2 is connected to the third ring gear R3 and is also connected to the transmission shaft 15 via the clutch C0. The second carrier CR2 is further connected to the case Cs via the one-way clutch F1 and the brake B2. The third sun gear S3 is connected to the transmission shaft 15 via the clutch C1.

Next, the operation of the transmission 18 will be explained.

Figure 2:
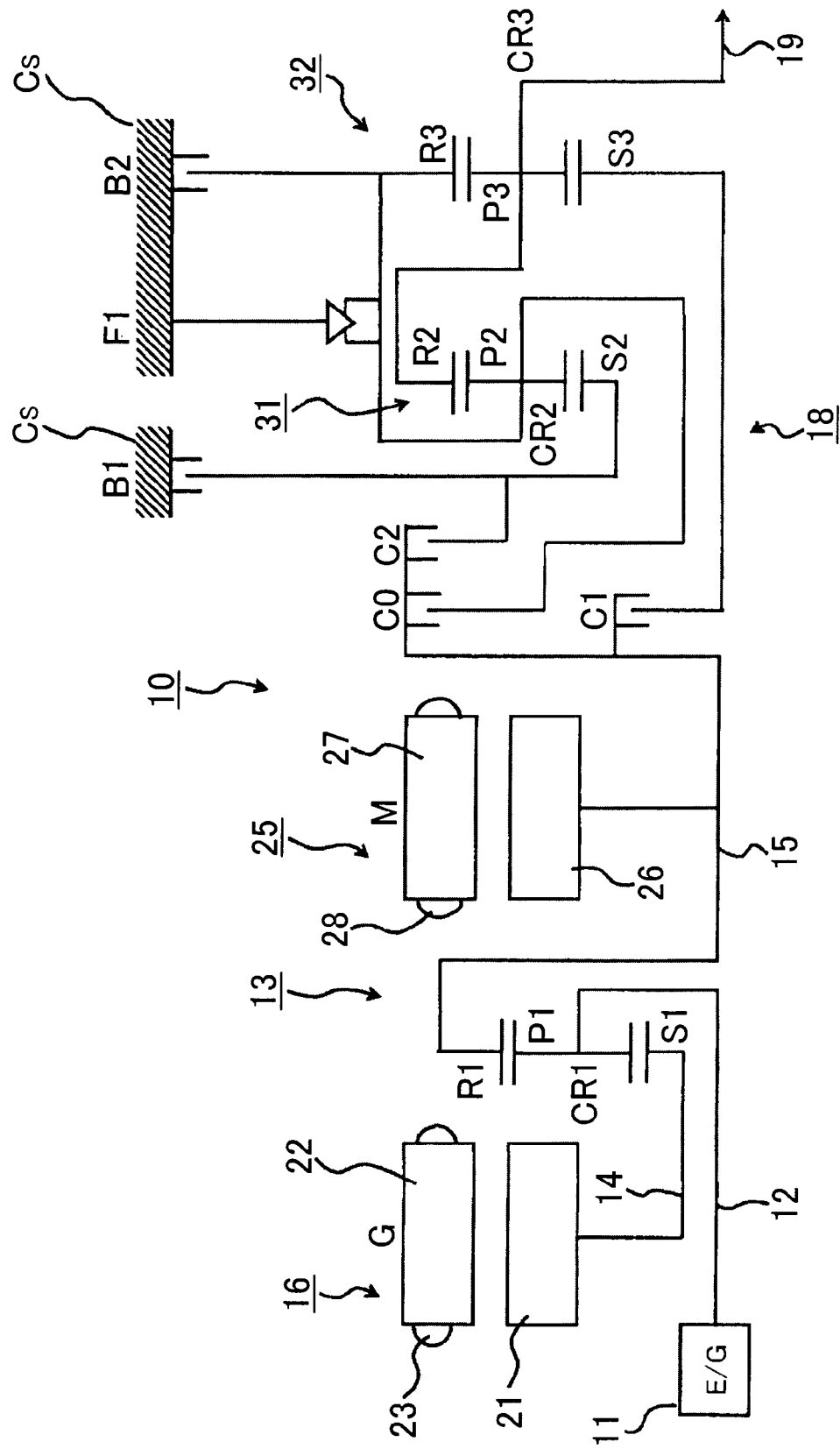
[FIG. 2]
Figures 3, 4:
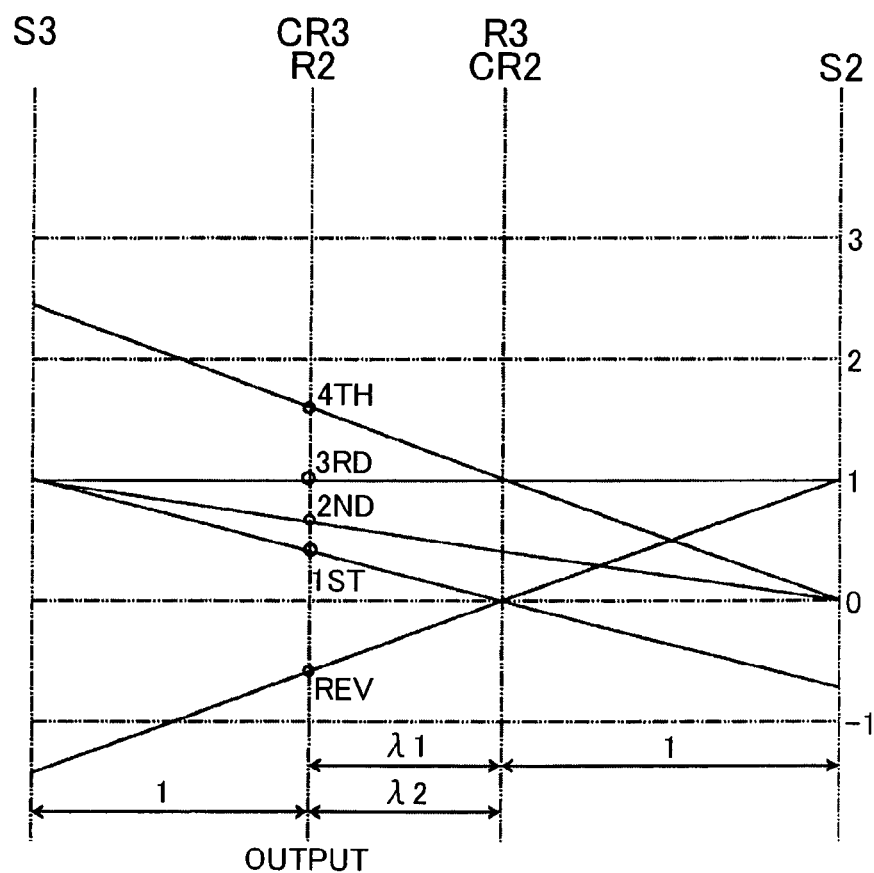
[FIG. 3]
[FIG. 4]

FIG. 2 is a drawing of an operation table for the transmission according to the embodiment of the present invention. FIG. 3 is a velocity diagram for the transmission according to the embodiment of the present invention.

In the drawings, reference characters C0 to C2 denote the clutches and reference characters B1 and B2 denote the brakes. Reference character F1 denotes the one-way clutch. Reference characters 1ST, 2ND, 3RD, and 4TH denote first to fourth forward speeds. Reference character REV denotes a gear for driving in reverse. Circles in the table indicate engagement of the clutches C0 to C2 and the brakes B1 and B2, and that the one-way clutch F1 is in a locked state. The circle in parentheses indicates that the brake B2 is engaged when an engine brake is used. Blank areas in the table indicate release of the clutches C0 to C2 and the brakes B1 and B2, and that the one-way clutch F1 is in a free state.

Reference character S2 denotes the second sun gear, and reference character R2 denotes the second ring gear. Reference character CR2 denotes the second carrier, S3 denotes the third sun gear, R3 denotes the third ring gear, and CR3 denotes the third carrier.

Reference character $\lambda 1$ denotes a ratio of the number of teeth in the second sun gear S2 to the number of teeth in the second ring gear R2, and reference character $\lambda 2$ denotes a ratio of the number of teeth in the third sun gear S3 to the number of teeth in the third ring gear R3. Numerals −1, 0, 1, 2, and 3 shown in FIG. 4 denote relative rotation speeds when a rotation input to each shaft, i.e., a rotation speed of the rotation shaft, is expressed as 1.

With the transmission 18 (cf. FIG. 1) structured as described above, at the first forward speed, the clutch C1 is engaged and the one-way clutch F1 is in a locked state. In this situation, due to engagement of the clutch C1, the rotation of the transmission shaft 15 is input to the third sun gear S3, so that the third sun gear S3 is rotated at a rotation speed 1. Meanwhile, due to the locked state of the one-way clutch F1, the rotation speed of the third ring gear R3 is zero (0), so that a rotation reduced to a first-gear speed is output from the third carrier CR3 to the output shaft 19.

At the second forward speed, the clutch C1 and the brake B1 are engaged. In this situation, due to engagement of the clutch C1, the rotation of the transmission shaft 15 is input to the third sun gear S3, so that the third sun gear S3 is rotated at the rotation speed 1. Meanwhile, due to engagement of the brake B2, the rotation speed of the second sun gear S2 is zero, so that a rotation reduced to a second-gear speed, which is higher than the first-gear speed, is output from the third carrier CR3 to the output shaft 19.

At the third forward speed, the clutches C0 and C1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the clutch C1, the rotation of the transmission shaft 15 is input to the third sun gear S3, so that the third sun gear S3 is rotated at the rotation speed 1. As a result, the transmission 18 is in a state of direct coupling, and thus, rotation at a third-gear speed, which is the same as the rotation speed of the transmission shaft 15, is output from the third carrier CR3 to the output shaft 19.

At the fourth forward speed, the clutch C0 and the brake B1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the brake B1, the rotation speed of the second sun gear S2 is zero, so that a rotation increased to a fourth-gear speed, which is higher than the rotation speed of the transmission shaft 15, is output from the third carrier CR3 to the output shaft 19.

When the vehicle is driven in reverse, the clutch C2 and the brake B2 are engaged. In this situation, due to engagement of the clutch C2, the rotation of the transmission shaft 15 is input to the second sun gear S2, so that the second sun gear S2 is rotated at the rotation speed 1. Meanwhile, due to engagement of the brake B2, the rotation speed of the third ring gear R3 is zero, so that a rotation in a reverse direction of the rotation of the transmission shaft 15 is output from the third carrier CR3 to the output shaft 19.

Next, the electric vehicle drive control device of the present invention will be explained.

FIG. 4 is a block diagram of the electric vehicle drive control device according to the embodiment of the present invention.

In the drawing, the reference numeral 10 denotes the vehicle driving apparatus, whereas the reference numeral 11 denotes the engine, and reference numeral 12 denotes the output shaft. The vehicle driving apparatus 10 includes the planetary gear unit 13, the transmission shafts 14 and 15, the generator 16, the motor 25, the transmission 18, the output shaft 19, a hydraulic pressure control device 35, and a pump (a mechanical O/P) 36. The hydraulic pressure control device 35 supplies and drains oil to and from a hydraulic servo by which the clutches C0 (cf. FIG. 1) to C2 and the brakes B1 and B2 in the transmission 18 are engaged and disengaged. The pump 36 is operated by the rotation of the engine 11 and mechanically generates a predetermined hydraulic pressure, which is supplied to the hydraulic pressure control device 35.

A differential mechanism 38 is connected to the output shaft 19. The differential mechanism 38 distributes the rotation transferred via the output shaft 19 and transfers such rotation to driven wheels 39.

Reference numeral 41 denotes an inverter device that includes an inverter for driving the generator 16 and an inverter for driving the motor 25. Reference numeral 43 denotes an electric current sensor that serves as an electric current detecting unit and detects the electric current flowing in the generator 16. Reference numeral 45 denotes an electric current sensor that serves as an electric current detecting unit and detects the electric current flowing in the motor 25. Reference numeral 46 denotes the battery, and reference numeral 47 denotes a battery voltage detecting sensor that serves as a battery voltage detecting unit. Reference numeral 48 denotes a rotation speed sensor that serves as a rotation speed detecting unit and detects a generator rotation speed NG. Reference numeral 49 denotes a rotation speed sensor that serves as a rotation speed detecting unit and detects the rotation speed of the motor 25, i.e., a motor rotation speed NM. Reference numeral 50 denotes a rotation speed sensor that serves as a rotation speed detecting unit and detects the rotation speed of the engine 11, i.e., an engine rotation speed NE. Reference numeral 53 denotes a hydraulic pressure sensor that serves as a hydraulic pressure detecting unit and detects the hydraulic pressure in the hydraulic pressure control device 35. Reference numeral 54 denotes an oil temperature sensor that serves as an oil temperature detecting unit and detects the oil temperature in the hydraulic pressure control device 35. Reference numeral 59 is a vehicle speed sensor that serves as a vehicle speed detecting unit and detects a vehicle speed V, based on the rotation speed of the output shaft 19. The engine rotation speed NE, the generator rotation speed NG, and the motor rotation speed NM structure drive state judgment indicators that are respectively used for judging the drive states of the engine 11, the generator 16, and the motor 25. The rotation speed sensors 48 to 50 structure a drive state judgment indicator detecting unit. The vehicle speed V structures a running load of the hybrid vehicle. The vehicle speed sensor 59 serves as a running load detecting unit.

Reference numeral 51 denotes a pump (an electric O/P) that electrically generates a predetermined hydraulic pressure and supplies the generated hydraulic pressure to the hydraulic pressure control device 35. Reference numeral 52 denotes an inverter for the electric O/P that drives the pump 51.

Reference numeral 55 denotes a vehicle control device that controls the entire hybrid vehicle; 56 denotes an engine control device that controls the engine 11; 57 denotes a generator/motor control device that controls the generator 16 and the motor 25; and 58 denotes a transmission control device that controls the transmission 18.

The vehicle control device 55 sends an engine control signal to the engine control device 56 so that the engine control device 56 configures the engine 11 to start or stop.

The vehicle control device 55 specifies an engine target rotation speed NE*, which is a target value for the engine rotation speed NE; a generator target torque TG*, which is a target value for the generator torque TG; and a motor target torque TM*, which is a target value for the motor torque TM. The generator/motor control device 57 specifies a generator target rotation speed NG*, which is a target value for the generator rotation speed NG, and a motor torque correction value δTM, which is a correction value for the motor torque TM.

Next, the operation of the electric vehicle control device will be explained.

Shift speed setting processing means (a shift speed processing unit) (not shown) included in the transmission control device 58 performs shift speed setting processing. The shift speed setting processing means reads an acceleration opening degree Ac, which expresses the engine load detected based on the amount by which an accelerator pedal (not shown) is pressed down, and also reads the vehicle speed V and the like. The shift speed setting processing means then specifies a shift speed by referring to a shift map in a recording device (not shown) that is included in the transmission control device 58. Subsequently, shift request processing means (a shift request processing unit) (not shown) included in the transmission control device 58 performs shift request processing. The shift request processing means judges whether a speed change for upshifting or a speed change for downshifting is necessary and whether shifting is unnecessary based on the specified shift speed. If it is judged that a speed change for upshifting is necessary, the shift request processing means generates an upshift request. If it is judged that a speed change for downshifting is necessary, the shift request processing means generates a downshift request. Shift processing means (a shift processing unit) (not shown) included in the transmission control device 58 performs shift processing. The shift processing means executes an upshift control or a downshift control and generates a speed change signal according to the upshift request or the downshift request.

Vehicle required torque calculation processing means (a vehicle required torque calculation processing unit) (not shown) included in the vehicle control device 55 performs vehicle required torque calculation processing. The vehicle required torque calculation processing means reads the vehicle speed V, the accelerator opening degree Ac and the like, and calculates a vehicle required torque TO* that is necessary in order to run the hybrid vehicle.

Next, vehicle required output calculation processing means (a vehicle required output calculation processing unit) (not shown) included in the vehicle control device 55 performs vehicle required output calculation processing. The vehicle required output calculation processing means calculates a driver required output PD by multiplying the vehicle required torque TO* by the vehicle speed V. The vehicle required output calculation processing means also calculates a battery charge/discharge required output PB, based on a battery remaining amount SOC detected by a battery remaining amount detecting sensor (not shown). Further, the vehicle required output calculation processing means calculates a vehicle required output PO by adding the driver required output PD to the battery charge/discharge required output PB.

Subsequently, engine target drive state setting processing means (an engine target drive state setting processing unit) (not shown) included in the vehicle control device 55 performs engine target drive state setting processing. The engine target drive state setting processing means determines a driving point of the engine 11, based on the vehicle required output PO, the accelerator opening degree Ac, and the like. The engine target drive state setting processing means then determines the engine torque TE at the driving point as an engine target torque TE* and also determines the engine rotation speed NE at the driving point as an engine target rotation speed NE*. Further, the engine target drive state setting processing means sends the engine target rotation speed NE* to the engine control device 56.

Start request processing means (a start request processing unit) (not shown) included in the engine control device 56 performs start request processing. The start request processing means judges whether the engine 11 is positioned at a drive area. If the engine 11 is positioned at a drive area AR1 but is not being driven, start processing means (a start processing unit) (not shown) included in the engine control device 56 performs start processing and generates an engine start request to start the engine 11. Next, engine start processing means (an engine start processing unit) (not shown) included in the engine control device 56 performs engine start processing and generates an engine start signal when the engine start request has been generated.

In the vehicle driving apparatus 10, at times when the motor 25 is driven and the motor torque TM is transferred to the driven wheels 39 via the transmission 18 to run the hybrid vehicle, this creates a need for the transmission to perform a speed change for downshifting and a need to start the engine 11. There are cases when a need arises to perform a control among the engine start control and the downshift control occurs while the other control is being executed. In such cases, regardless of whether the engine start control or the downshift control is executed first, the speed change for downshifting causes the generator rotation speed NG to experience a sharp increase followed by a sharp decrease, or a sharp decrease followed by a sharp increase. Thus, the generator rotation speed NG experiences successive large changes.

Figure 5:
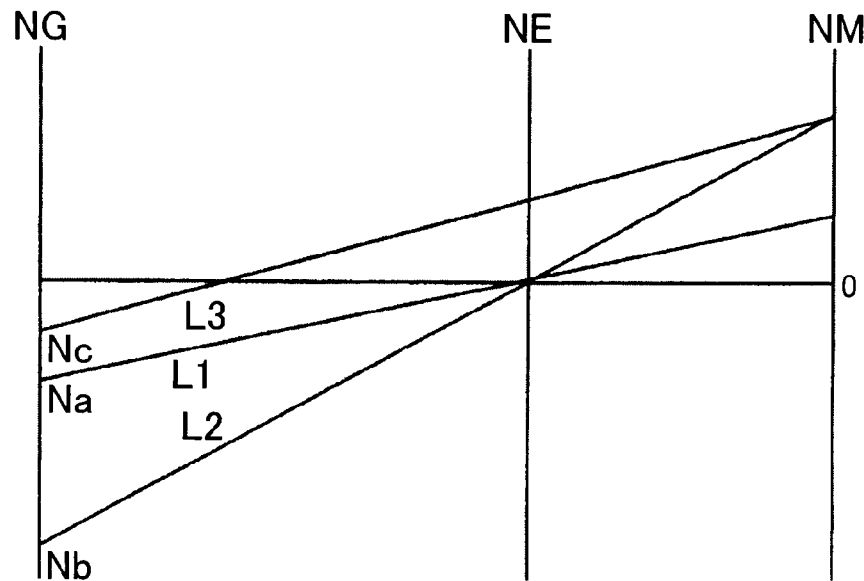
[FIG. 5]
Figure 6:
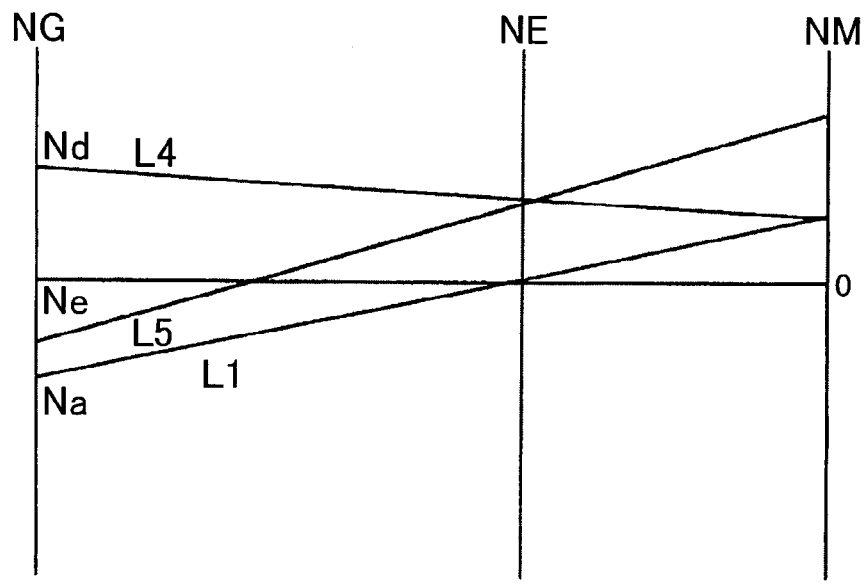
[FIG. 6]

FIG. 5 is a first drawing that shows an example of a change in the velocity diagram of a planetary gear unit when the engine start control and the downshift control are executed according to the embodiment of the present invention. FIG. 6 is a second drawing that shows an example of a change in the velocity diagram of the planetary gear unit when the engine start control and the downshift control are executed according to the embodiment of the present invention.

In the drawings, reference character NG denotes the generator rotation speed, reference character NE denotes the engine rotation speed, and reference character NM denotes the motor rotation speed. In FIG. 5, a line L1 indicates that the engine 11 (cf. FIG. 4) is stopped and the engine rotation speed NE is zero, whereas the motor 25 is driven at a constant motor rotation speed NM and the generator rotation speed NG is equal to a value Na. If the downshift control is executed at such times, then, as indicated by a line L2, the motor rotation speed NM increases and is accompanied by the generator rotation speed NG decreasing (increasing in the negative direction) to a value Nb. Subsequent execution of the engine start control drives the generator, and, as indicated by a line L3, the generator rotation speed NG is set to a value Nc so that the engine rotation speed NE becomes an ignition rotation speed required for starting.

As described above, the velocity diagram of the planetary gear unit 13 changes as shown by the lines L1, L2, and L3, whereby the generator rotation speed NG experiences a sharp decrease followed by a sharp increase. Thus, the generator rotation speed NG experiences successive large changes.

In FIG. 6, the line LI indicates that the engine 11 is stopped and the engine rotation speed NE is zero, whereas the motor 25 is driven at a constant motor rotation speed NM and the generator rotation speed NG is equal to a value Na. At such times, execution of the engine start control drives the generator 16, and as indicated by a line L4, the generator rotation speed NG is set to a value Nd so that the engine rotation speed NE becomes the ignition rotation speed required for starting. If the downshift control is subsequently executed, then, as indicated by a line L5, the motor rotation speed NM increases and is accompanied by the generator rotation speed NG decreasing to a value Ne.

In this situation as well, the velocity diagram of the planetary gear unit 13 changes as shown by the lines L1, L4, and L5, whereby the generator rotation speed NG experiences a sharp increase followed by a sharp decrease. Thus, the generator rotation speed NG experiences successive large changes.

To cope with such situations, according to the present embodiment, the engine start control and the downshift control are started at the same time, whereby both are simultaneously executed in parallel; or alternatively, at least one among the engine start control and the downshift control is executed, during which the other control is started and thereafter simultaneously executed in parallel. For this reason, vehicle drive processing means (a vehicle drive processing unit) (not shown) included in the vehicle control device 55 performs vehicle drive processing and simultaneously executes the engine start control and the downshift control in parallel.

Simultaneous control judgment processing means (a simultaneous control judgment processing unit) included in the vehicle drive processing means then performs simultaneous control judgment processing. The simultaneous control judgment processing means reads the generator rotation speed NG and determines the content for simultaneous control based on the generator rotation speed NG.

Figure 7:
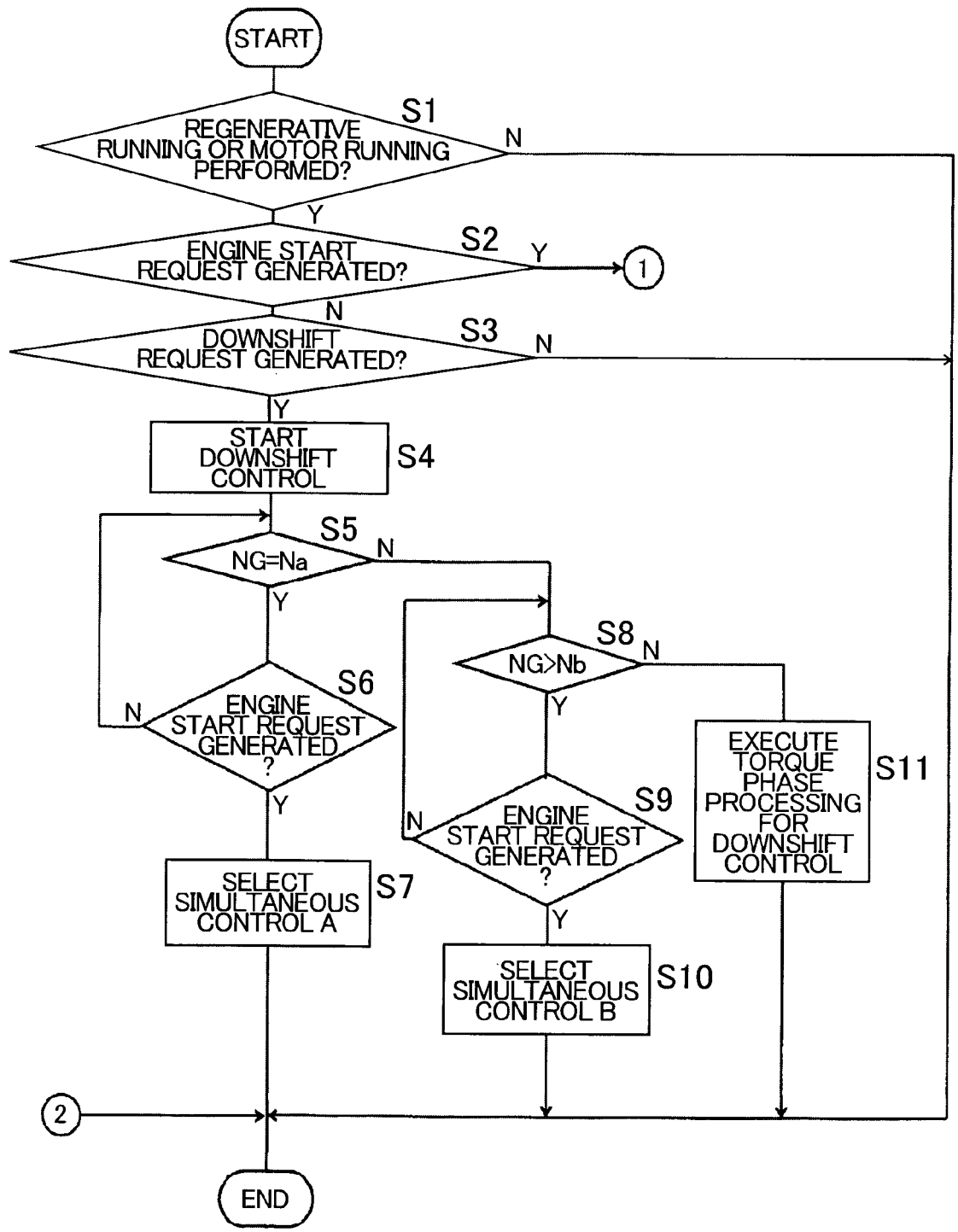
[FIG. 7]
Figure 8:
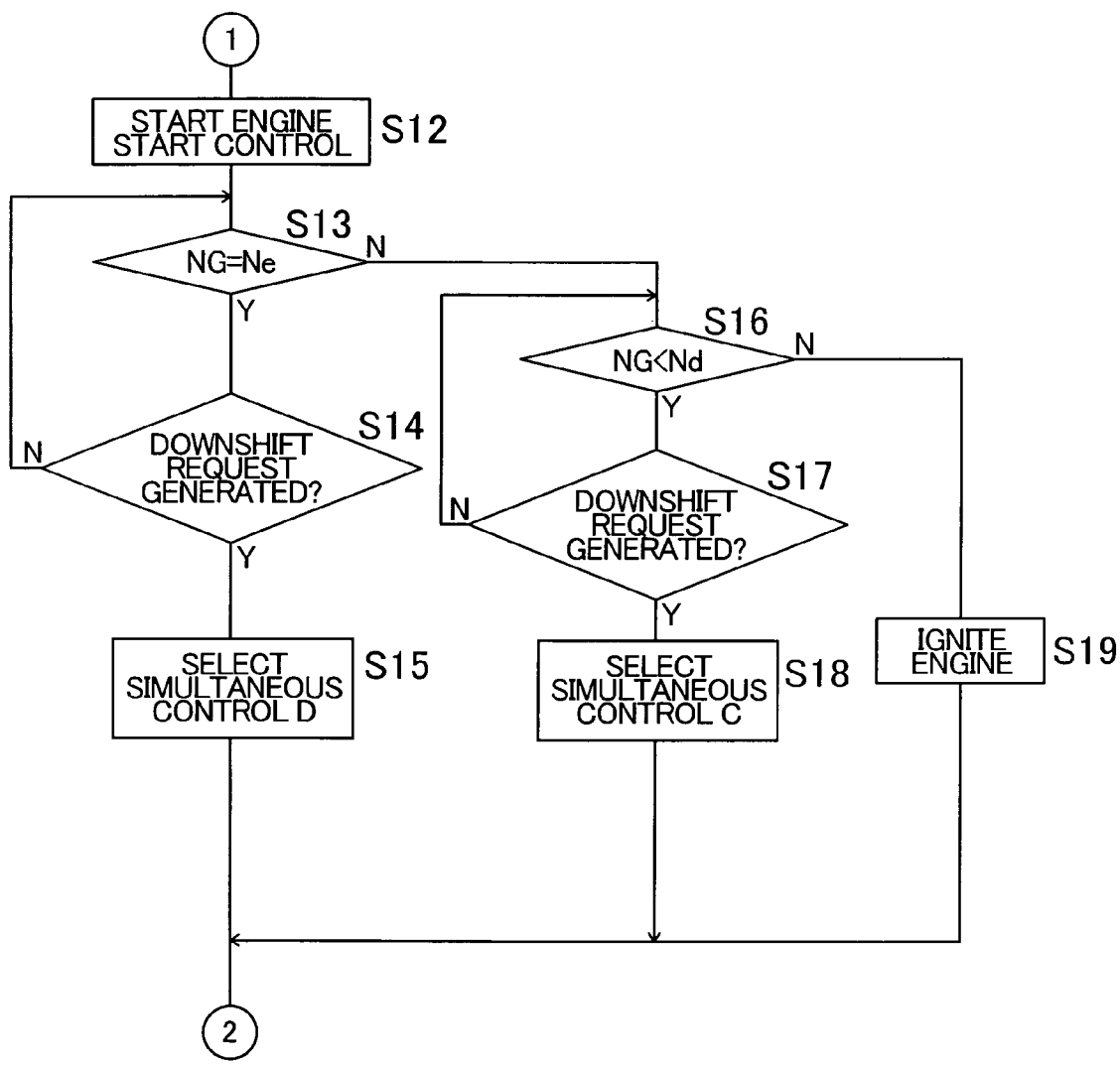
[FIG. 8]

FIG. 7 is a first flowchart that shows an operation of the simultaneous control judgment processing means according to the embodiment of the present invention. FIG. 8 is a second flowchart that shows an operation of the simultaneous control judgment processing means according to the embodiment of the present invention.

In this situation, running state judgment processing means (a running state judgment processing unit) included in the simultaneous control judgment processing means perform running state judgment processing. The running state judgment processing means reads the electric current detected by the electric current sensor 45 (cf. FIG. 4), the motor rotation speed NM detected by the rotation speed sensor 49 and the like, and judges whether the running state is regenerative running or motor running.

Simultaneous control condition judgment processing means (a simultaneous control condition judgment processing unit) included in the simultaneous control judgment processing means subsequently performs simultaneous control condition judgment processing and judges whether an engine start request is generated, and whether a downshift request is generated. If an engine start request has not been generated but a downshift request has, then the shift processing means starts the downshift control.

Next, simultaneous control selection processing means (a simultaneous control selection processing unit) included in the simultaneous control judgment processing means performs simultaneous control selection processing. The simultaneous control selection processing means reads the generator rotation speed NG and changes the content for simultaneous control based on the generator rotation speed NG. More specifically, the simultaneous control selection processing means judges whether the generator rotation speed NG is equal to the value Na. If the generator rotation speed NG is equal to the value Na and an engine start request is generated, then the simultaneous control selection processing means selects a simultaneous control A and outputs a simultaneous control command.

However, if the generator rotation speed NG is not the value Na, then the simultaneous control selection processing means judges whether the generator rotation speed NG is greater than the value Nb. If the generator rotation speed NG is greater than the value Nb and an engine start request is generated, then the simultaneous control selection processing means selects a simultaneous control B and outputs a simultaneous control command. If the generator rotation speed NG is less than the value Nb, then the shift processing means does not execute the engine start control, and performs processing for a torque phase of the downshift control.

Meanwhile, if an engine start request is generated, then the engine start processing means starts the engine start control.

Next, the simultaneous control selection processing means reads the generator rotation speed NG and judges whether the generator rotation speed NG is equal to a value Ne. If the generator rotation speed NG is equal to the value Ne and a downshift request is generated, then the simultaneous control selection processing means selects a simultaneous control D and outputs a simultaneous control command.

Or, if the generator rotation speed NG is not equal to the value Ne, then the simultaneous control selection processing means judges whether the generator rotation speed NG is less than a value Nd. If the generator rotation speed NG is less than the value Nd and a downshift request is generated, then the simultaneous control selection processing means selects a simultaneous control C and outputs a simultaneous control command. If the generator rotation speed NG is greater than the value Nd, then the engine start processing means ignites the engine 11.

The flowcharts in FIGS. 7 and 8 will be explained.

Step S1: It is judged whether the running state is regenerative running or motor running. If the running state is regenerative running or motor running, then the procedure proceeds to step S2. If the running state is not regenerative running or motor running, then the procedure ends.

Step S2: It is judged whether an engine start request is generated. If an engine start request has been generated, then the procedure proceeds to step S12; if not, then the procedure proceeds to step S3.

Step S3: It is judged whether a downshift request is generated. If a downshift request has been generated, then the procedure proceeds to step S4; if not, then the procedure ends.

Step S4: The downshift control is started.

Step S5: It is judged whether the generator rotation speed NG is equal to the value Na. If the generator rotation speed NG is equal to the value Na, then the procedure proceeds to step S6. If the generator rotation speed NG is not equal to the value Na, then the procedure proceeds to step S8.

Step S6: It is judged whether an engine start request is generated. If an engine start request has been generated, then the procedure proceeds to step S7; if not, then the procedure returns to step S5.

Step S7: The simultaneous control A is selected and the procedure ends.

Step S8: It is judged whether the generator rotation speed NG is greater than the value Nb. If the generator rotation speed NG is greater than the value Nb, then the procedure proceeds to step S9. If the generator rotation speed NG is less than the value Nb, then the procedure proceeds to step S11.

Step S9: It is judged whether an engine start request is generated. If an engine start request has been generated, then the procedure proceeds to step S10; if not, then the procedure returns to step S8.

Step S10: The simultaneous control B is selected and the procedure ends.

Step S11: Processing for a torque phase of the downshift control is performed and the procedure ends.

Step S12: The engine start control is started.

Step S13: It is judged whether the generator rotation speed NG is equal to the value Ne. If the generator rotation speed NG is equal to the value Ne, then the procedure proceeds to step S14. If the generator rotation speed NG is not equal to the value Ne, then the procedure proceeds to step S16.

Step S14: It is judged whether a downshift request is generated. If a downshift request has been generated, then the procedure proceeds to step S15; if not, then the procedure returns to step S13.

Step S15: The simultaneous control D is selected and the procedure ends.

Step S16: It is judged whether the generator rotation speed NG is less than the value Nd. If the generator rotation speed NG is less than the value Nd, then the procedure proceeds to step S17. If the generator rotation speed NG is greater than the value Nd, then the procedure proceeds to step S19.

Step S17: It is judged whether a downshift request is generated. If a downshift request has been generated, then the procedure proceeds to step S18; if not, then the procedure returns to step S16.

Step S18: The simultaneous control C is selected and the procedure ends.

Step S19: The engine 11 is ignited and the procedure ends.

Next, simultaneous control execution processing means (a simultaneous control execution processing unit) included in the vehicle drive processing means performs simultaneous control execution processing. The simultaneous control execution processing means executes the selected simultaneous controls A to D. While either the engine start control or the downshift control is being executed, the simultaneous control execution processing means starts the other control.

Figure 9:
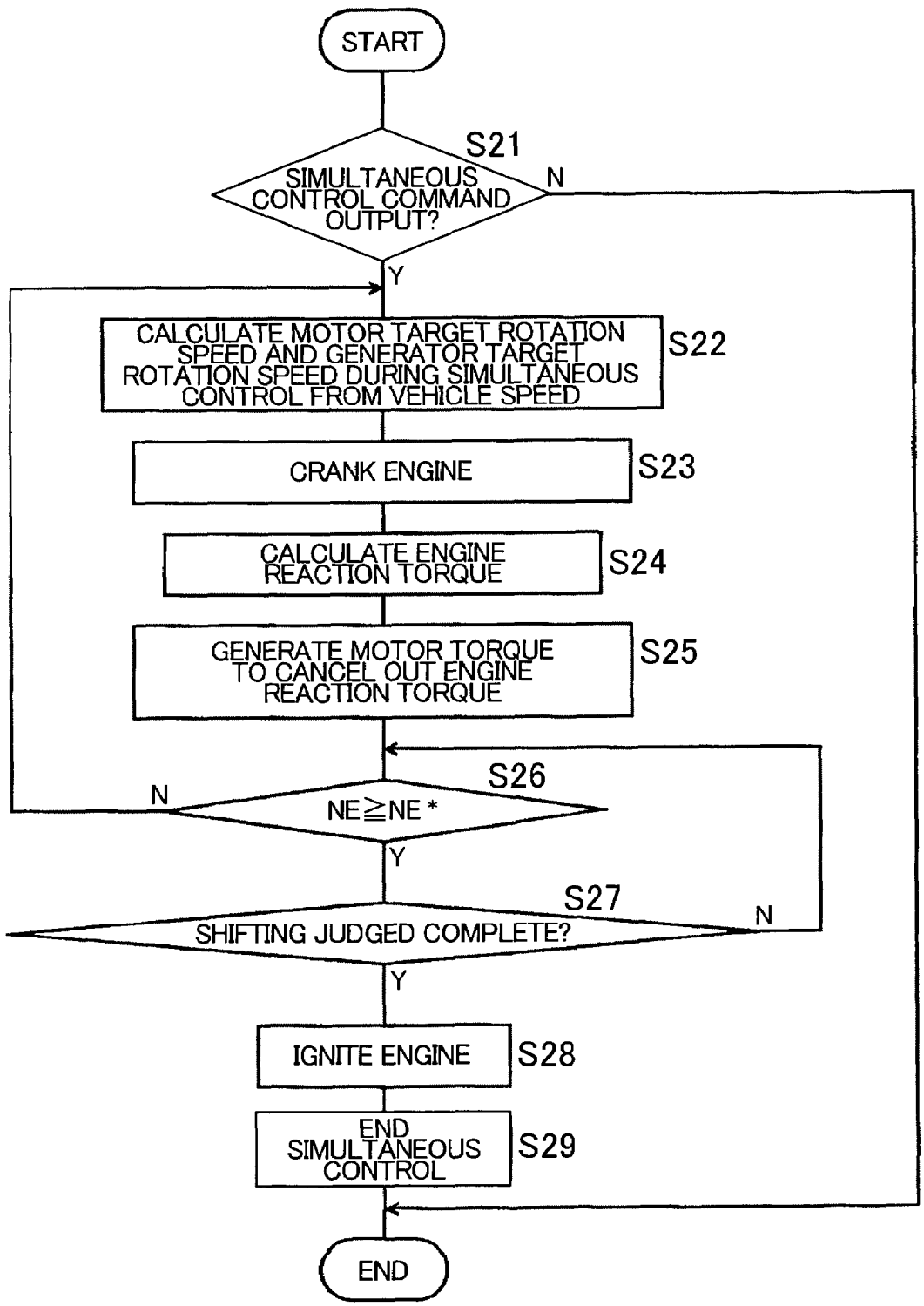
[FIG. 9]
Figure 10:
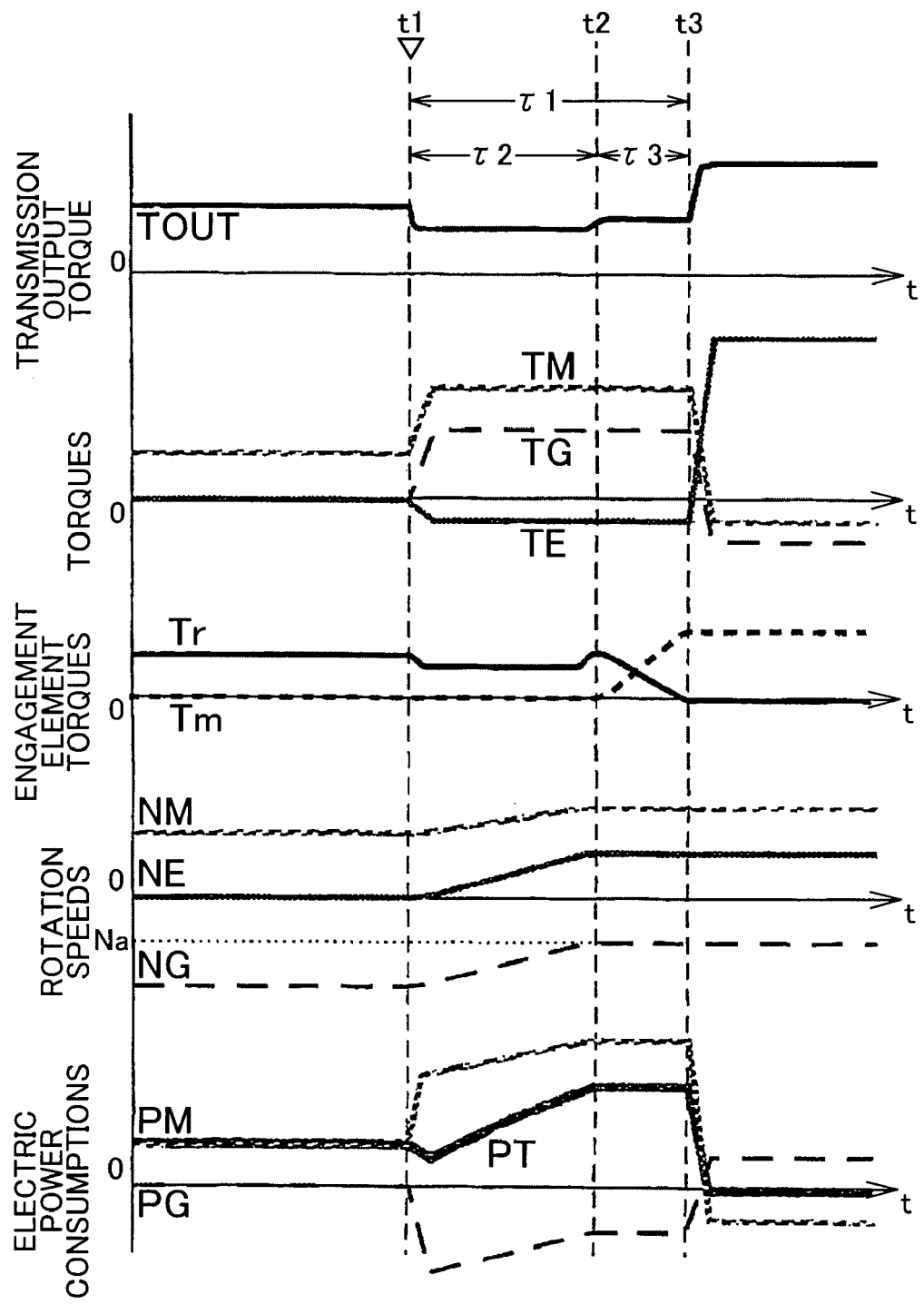
[FIG. 10]
Figure 11:
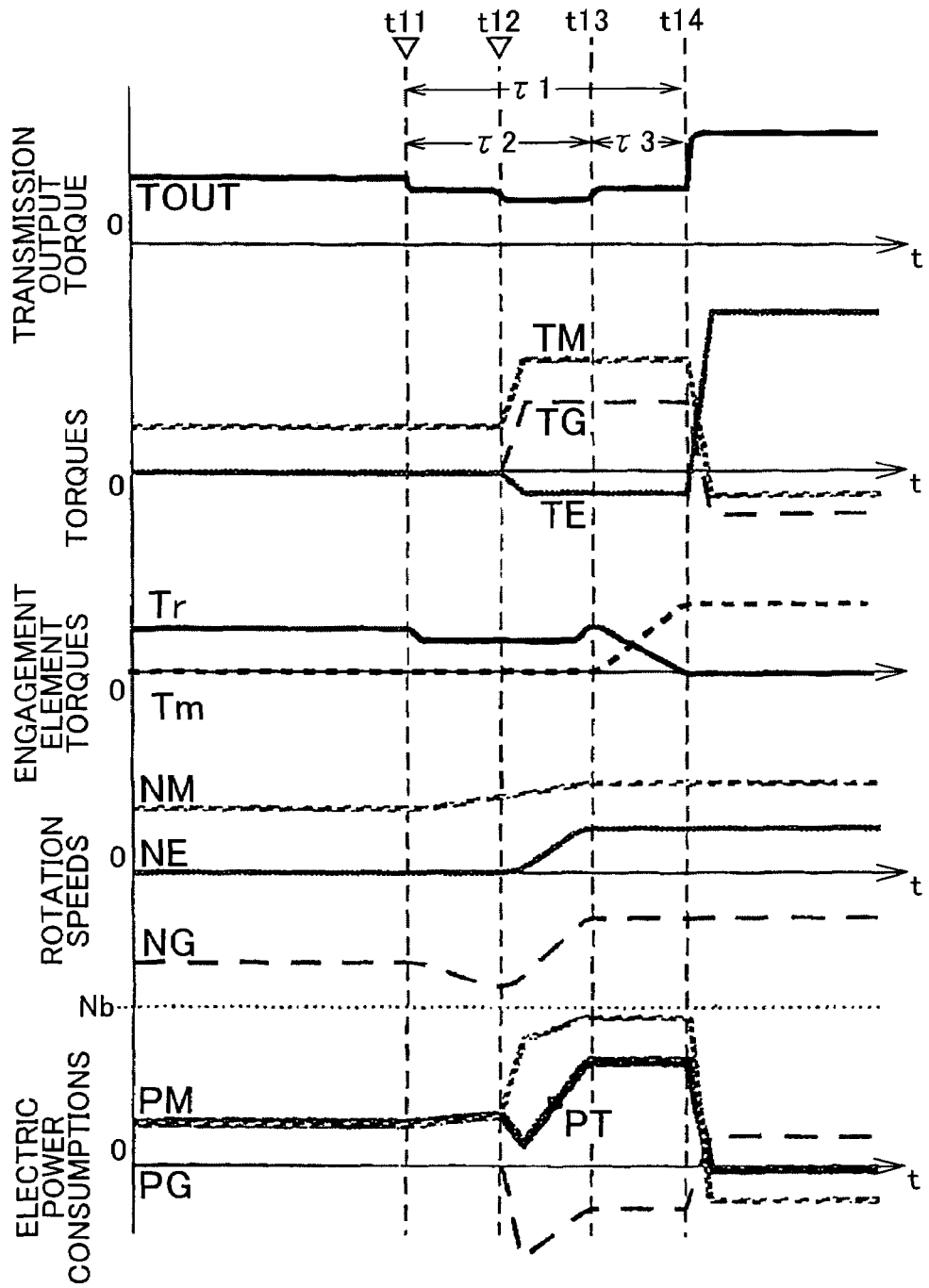
[FIG. 11]
Figure 12:
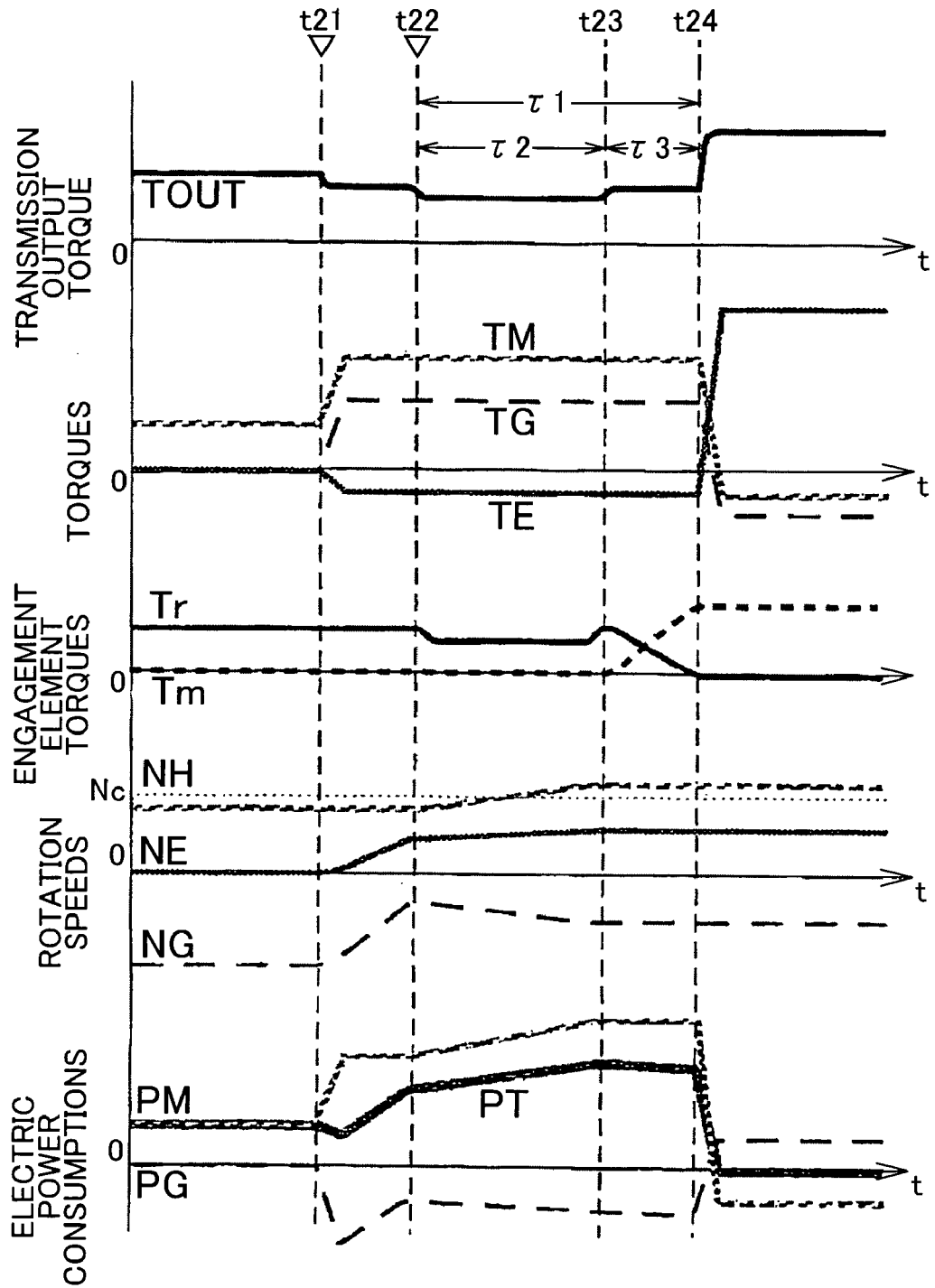
[FIG. 12]
Figure 13:
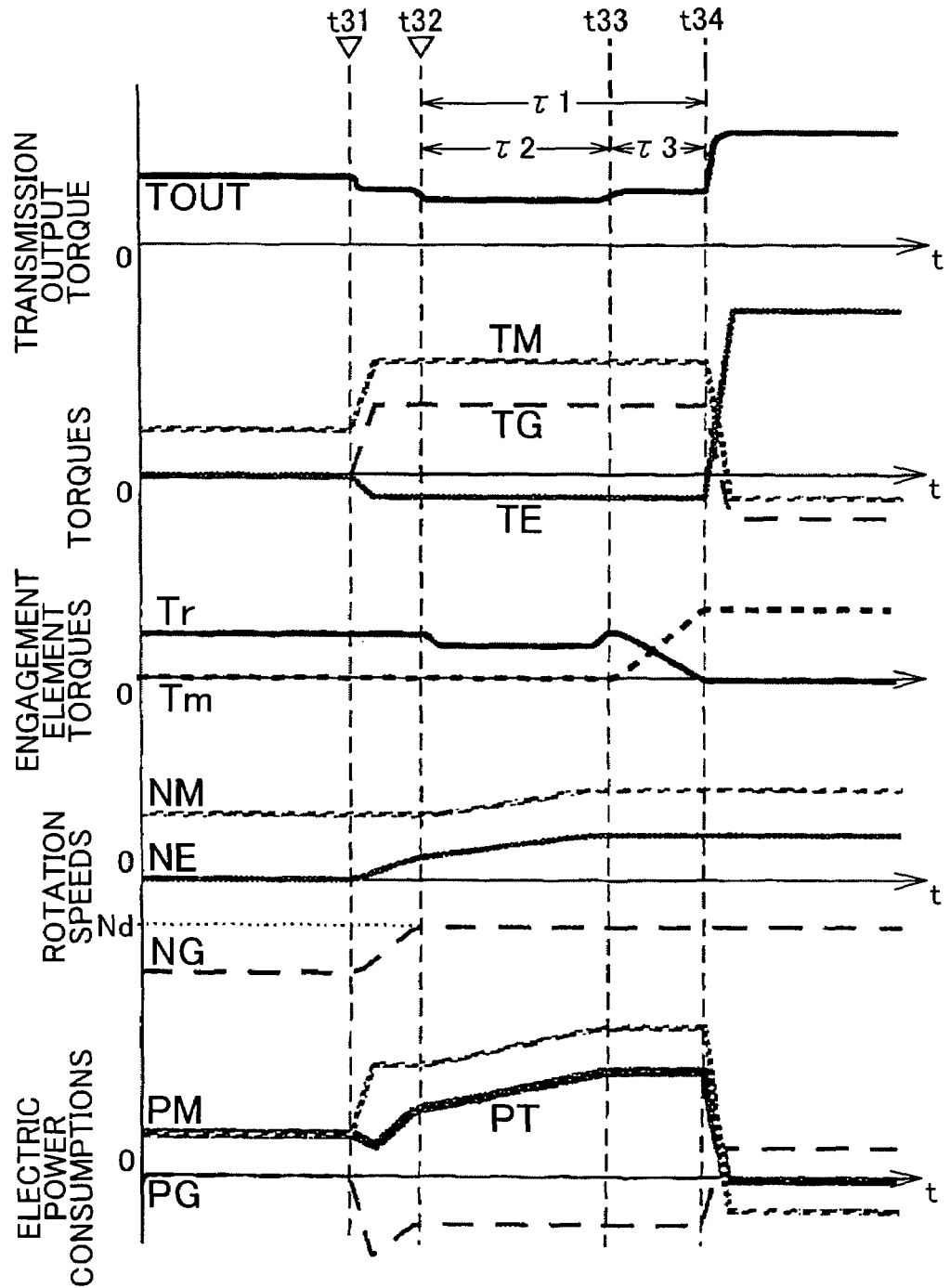
[FIG. 13]

FIG. 9 is a flowchart that shows an operation of the simultaneous control execution processing means according to the embodiment of the present invention. FIG. 10 is a first time chart that shows an operation of the simultaneous control execution processing means according to the embodiment of the present invention. FIG. 11 is a second time chart that shows an operation of the simultaneous control execution processing means according to the embodiment of the present invention. FIG. 12 is a third time chart that shows an operation of the simultaneous control execution processing means according to the embodiment of the present invention. FIG. 13 is a fourth time chart that shows an operation of the simultaneous control execution processing means according to the embodiment of the present invention.

First, generator target rotation speed calculation processing means (a generator target rotation speed calculation processing unit) included in the simultaneous control execution processing means performs generator target rotation speed calculation processing. The generator target rotation speed calculation processing means judges whether a simultaneous control command is output. If a simultaneous control command has been output, then the generator target rotation speed calculation processing means reads the vehicle speed V and calculates a post-shift motor target rotation speed NM* and the generator target rotation speed NG* during simultaneous control. Note that in such case the generator target rotation speed NG* is calculated based on the post-shift motor target rotation speed NM*, the engine target rotation speed NE* when the engine 11 (cf. FIG. 4) is started, and a gear ratio of the transmission 18. Further, the motor target rotation speed NM* may be calculated based on the motor rotation speed NM detected by the rotation speed sensor 49, instead of using the vehicle speed V. Therefore, motor target rotation speed calculation processing means (a motor target rotation speed calculation processing unit) included in the simultaneous control execution processing means performs motor target rotation speed calculation processing, and calculates the post-shift motor target rotation speed NM* based on the vehicle speed V and a shift ratio before and after shifting. Engine target rotation speed calculation processing means (an engine target rotation speed calculation processing unit) included in the simultaneous control execution processing means performs engine target rotation speed calculation processing, and calculates the engine target rotation speed NE* when the engine is started, as determined by the accelerator opening degree Ac. Also note that the generator target rotation speed calculation processing means structures first electric machine rotation speed calculation processing means (a first electric machine rotation speed calculation processing unit), which serves as first electric motor rotation speed calculation processing means (a first electric motor rotation speed calculation processing unit). The motor target rotation speed calculation processing means structures second electric machine rotation speed calculation processing means (a second electric machine rotation speed calculation processing unit), which serves as second electric motor rotation speed calculation processing means (a second electric motor rotation speed calculation processing unit).

Next, cranking processing means (a cranking processing unit) included in the simultaneous control execution processing means performs cranking processing. The cranking processing means cranks the engine 11 so that the generator rotation speed NG increases to the generator target rotation speed NG*. However, if the engine start processing means has already started the engine start control, then cranking is performed in conjunction with starting of the engine start control. Then, following selection of the simultaneous controls C and D, the engine rotation speed NE is changed for cranking.

Due to the inertia of the hybrid vehicle at this time, the same value should be used for the motor rotation speed NM. However, cranking of the engine 11 leads to the generation of a reaction force, i.e., an engine reaction torque, which works to lower the motor rotation speed NM. Hence, reaction force counter-torque generation processing means (a reaction force counter-torque generation processing unit) included in the simultaneous control execution processing means performs reaction force counter-torque generation processing. The reaction force counter-torque generation processing means calculates the engine reaction torque, and generates the motor torque TM so as to cancel out the engine reaction torque.

Next, engine rotation speed judgment processing means (an engine rotation speed judgment processing unit) included in the simultaneous control execution processing means performs engine rotation speed judgment processing. The engine rotation speed judgment processing means reads the generator rotation speed NG and the motor rotation speed NM. It is then judged whether the engine rotation speed NE calculated based on the generator rotation speed NG and the motor rotation speed NM has reached the engine target rotation speed NE*, which is an engine start rotation speed NEth. If the engine rotation speed NE has reached the engine target rotation speed NE*, then shift end judgment processing means (a shift end judgment processing unit) included in the simultaneous control execution processing means performs shift end judgment processing. The shift end judgment processing means judges whether shifting has ended. If shifting has ended, then engine ignition processing means (an engine ignition processing unit) included in the simultaneous control execution processing means performs engine ignition processing and ignites the engine 11.

According to the simultaneous control execution processing, the simultaneous control A is executed as shown in FIG. 10; the simultaneous control B is executed as shown in FIG. 11; the simultaneous control C is executed as shown in FIG. 12; and the simultaneous control D is executed as shown in FIG. 13.

In FIGS. 10 to 14, reference character $\tau 1$ denotes a section from the time when shifting is started and to the time when shifting is ended. Reference character $\tau 2$ denotes an inertia phase that is a section where engagement and disengagement of the clutches C0 (cf. FIG. 1) to C2 and the brakes B1 and B2 is completed after shifting is started. Reference character $\tau 3$ denotes a torque phase that is a section after engagement and disengagement of the clutches C0 to C2 and the brakes B1 and B2 is completed to until shifting is ended.

Shown in the drawings are: an output torque TOUT that is output to the output shaft 19 while shifting is performed; torques that include the engine torque TE, the generator torque TG, and the motor torque TM; engagement element torques that include an engagement-side torque Tm of the friction engagement element engaged while shifting is performed and a release-side torque Tr of the friction engagement element released while shifting is performed; rotation speeds that include the engine rotation speed NE, the generator rotation speed NG, and the motor rotation speed NM; an electric power consumption PG of the generator 16; an electric power consumption PM of the motor 25; and a total electric power consumption PT obtained by adding the electric power consumptions PG and PM together.

In the simultaneous control A of FIG. 10, at a timing t1, the downshift control is started and a shift signal for a speed change for downshifting is generated, whereby shifting is started. Additionally, the engine start control is started and an engine start signal is generated, whereby the generator rotation speed NG is increased. At a timing t2, the inertia phase $\tau 2$ ends and the torque phase $\tau 3$ starts. At this time, the engine rotation speed NE reaches the engine target rotation speed NE*, which is the engine start rotation speed NEth. At a timing t3, the torque phase $\tau 3$ ends and the engine 11 is ignited.

In the simultaneous control B of FIG. 11, at a timing t11, the downshift control is started and a shift signal for a speed change for downshifting is generated, whereby shifting is started. At a timing t12, the engine start control is started and an engine start signal is generated, whereby the generator rotation speed NG is increased. At a timing t13, the inertia phase $\tau 2$ ends and the torque phase $\tau 3$ starts. At this time, the engine rotation speed NE reaches the engine target rotation speed NE*, which is the engine start rotation speed NEth. At a timing t14, the torque phase $\tau 3$ ends and the engine 11 is ignited.

In the simultaneous control C of FIG. 12, at a timing t21, the engine start control is started and an engine start signal is generated, whereby the generator rotation speed NG is increased. At a timing t22, the downshift control is started and a shift signal for a speed change for downshifting is generated, whereby shifting is started. At a timing t23, the inertia phase $\tau 2$ ends and the torque phase $\tau 3$ starts. At this time, the engine rotation speed NE reaches the engine target rotation speed NE*, which is the engine start rotation speed NEth. At a timing t24, the torque phase $\tau 3$ ends and the engine 11 is ignited.

In the simultaneous control D of FIG. 13, at a timing t31, the engine start control is started and an engine start signal is generated, whereby the generator rotation speed NG is increased. At a timing t32, the downshift control is started and a shift signal for a speed change for downshifting is generated, whereby shifting is started. At a timing t33, the inertia phase $\tau 2$ ends and the torque phase $\tau 3$ starts. At this time, the engine rotation speed NE reaches the engine target rotation speed NE*, which is the engine start rotation speed NEth. At a timing t34, the torque phase $\tau 3$ ends and the engine 11 is ignited.

As described above, in the simultaneous controls A to D, the engine start control and the downshift control are started at the same time, whereby both are simultaneously executed in parallel; or alternatively, at least one among the engine start control and the downshift control is executed, during which the other control is started and thereafter simultaneously executed in parallel. Therefore, the generator rotation speed NG does not experience a sharp decrease followed by a sharp increase, and moreover, the generator rotation speed NG does not experience a sharp increase followed by a sharp decrease. Thus, the generator rotation speed NG does not experience successive large changes.

As a result, the shift shock is smoothed and a diminished running feel can be prevented.

In addition, one of the controls is started while the other control is being executed, and therefore the time until the overall control is complete can be shortened. Accordingly, the hybrid vehicle can respond faster to an accelerator operation by the driver. This can ensure that the hybrid vehicle does not feel sluggish and improve the running feel.

The flowchart in FIG. 9 will be explained.

Step S21: It is judged whether a simultaneous control command is output. If a simultaneous control command has been output, then the procedure proceeds to step S22; if not, then the procedure ends.

Step S22: The motor target rotation speed NM* and the generator target rotation speed NG* during simultaneous control are calculated from the vehicle speed V.

Step S23: The engine 11 is cranked.

Step S24: The engine reaction force is calculated.

Step S25: The motor torque TM to cancel out the engine reaction torque is generated.

Step S26: It is judged whether the engine rotation speed NE is equal to or greater than the engine target rotation speed NE*, which is the engine start rotation speed NEth. If the engine rotation speed NE is equal to or greater than the engine target rotation speed NE*, then the procedure proceeds to step S27. If the engine rotation speed NE is less than the engine target rotation speed NE*, then the procedure returns to step S22.

Step S27: It is judged whether a shift complete judgment has been made. If shifting has been judged as complete, then the procedure proceeds to step S28; if not, then the procedure returns to step S26.

Step S28: The engine 11 is ignited.

Step S29: The simultaneous control is ended and the procedure ends.

The present invention is not limited to the above embodiment, and may be modified in various forms based on the spirit of the present invention. Such modifications shall be regarded as within the scope of the present invention.

INDUSTRIAL APPLICABILITY

The present invention is applicable to a vehicle driving apparatus for a hybrid vehicle.

The invention claimed is:

1. An electric vehicle drive control device, comprising:
   a first electric motor and a second electric motor that are mechanically connected with an engine;
   a differential device that includes first, second and third rotational elements, wherein the first rotational element is connected with the first electric motor, the second rotational element is connected with the second electric motor, and the third rotational elements is connected with the engine;
   a transmission that is connected with the second electric motor via a transmission shaft, and that shifts a speed of a rotation transferred from the transmission shaft; and
   a controller that:
   judges whether an engine start request for starting the engine is generated and whether a downshift request is generated; and
   starts, if the engine start request and the downshift request are generated, one of an engine start control and a downshift control when the other of the engine start control and the downshift control is executed.

2. The electric vehicle drive control device according to claim 1, wherein the controller starts the engine start control and the downshift control at an identical timing.

3. The electric vehicle drive control device according to claim 1, wherein the controller starts the engine start control and the downshift control at different timings.

4. The electric vehicle drive control device according to claim 1, wherein the controller selects content for simultaneous shifting based on a rotation speed of the first electric motor.

5. The electric vehicle drive control device according to claim 1, wherein the controller:
   calculates a target rotation speed of the second electric motor based on a shift ratio, and
   calculates a target rotation speed of the first electric motor based on the target rotation speed of the second electric motor, a target rotation speed of the engine, and a gear ratio.

6. The electric vehicle drive control device according to claim 1, wherein
   the differential device is a planetary gear unit formed from a single planetary gear, and
   the transmission is provided with first and second gear units formed from single planetary gears.

7. The electric vehicle drive control device according to claim 1, wherein
   the first electric motor is a generator,
   the second electric motor is a drive motor, and
   in the differential device, the first rotational element is a first sun gear connected to the generator, the second rotational element is a first ring gear connected to the drive motor and the transmission, and the third rotational element is a first carrier connected to the engine.

8. The electric vehicle drive control device according to claims 7, wherein
   the first gear unit in the transmission is provided with a second sun gear, a second ring gear, and a second carrier,
   the second gear unit in the transmission is provided with a third sun gear, a third ring gear, and a third carrier,
   the second sun gear is connected to the first ring gear via a clutch and connected to a case via a brake,
   the second ring gear is connected to the third carrier and an output shaft,
   the second carrier is connected to the third ring gear, connected to the first ring gear via the clutch, and connected to the case via a one-way clutch and the brake, and
   the third sun gear is connected to the first ring gear via the clutch.

9. A control method for an electric vehicle drive control device comprising a first electric motor and a second electric motor that are mechanically connected with an engine; a differential device that includes first, second and third rotational elements, wherein the first rotational element is connected with the first electric motor, the second rotational element is connected with the second electric motor, and the third rotational elements is connected with the engine; and a transmission that is connected with the second electric motor via a transmission shaft, and that shifts a speed of a rotation transferred from the transmission shaft, comprising:
   judging whether an engine start request for starting the engine is generated and whether a downshift request is generated; and
   starting, if the engine start request and the downshift request are generated, one of an engine start control and a downshift control when the other of the engine start control and the downshift control is executed.

10. The method according to claim 9, wherein the engine start control and the downshift control are started at an identical timing.

11. The method according to claim 9, wherein the engine start control and the downshift control are started at different timings.

12. The method according to claim 9, wherein content for simultaneous shifting is selected based on a rotation speed of the first electric motor.

13. The method according to claim 9, wherein a target rotation speed of the second electric motor is calculated based on a shift ratio, and a target rotation speed of the first electric motor is calculated based on the target rotation speed of the second electric motor, a target rotation speed of the engine, and a gear ratio.

* * * * *